(12) United States Patent
Shimomura et al.

(10) Patent No.: US 7,942,424 B2
(45) Date of Patent: May 17, 2011

(54) LIP TYPE SEAL

(75) Inventors: Takao Shimomura, Minato (JP); Hideki Tomoto, Minato (JP); Masamitsu Sanada, Minato (JP)

(73) Assignee: Eagle Industry Co., Ltd. (JP)

( * ) Notice: Subject to any disclaimer, the term of this patent is extended or adjusted under 35 U.S.C. 154(b) by 376 days.

(21) Appl. No.: 12/255,258

(22) Filed: Oct. 21, 2008

(65) Prior Publication Data

US 2009/0134585 A1  May 28, 2009

(30) Foreign Application Priority Data

Nov. 28, 2007  (JP) ................ 2007-306797

(51) Int. Cl.
*F16J 15/32* (2006.01)
(52) U.S. Cl. .................. 277/551; 277/572; 277/577
(58) Field of Classification Search ............... 277/353, 277/549, 551, 562, 572, 576, 577
See application file for complete search history.

(56) References Cited

U.S. PATENT DOCUMENTS

| | | | | |
|---|---|---|---|---|
| 2,966,376 A * | 12/1960 | Reynolds | | 277/550 |
| 3,362,719 A * | 1/1968 | McCormick | | 277/551 |
| 3,682,488 A * | 8/1972 | Matsushima | | 277/551 |
| 4,283,063 A * | 8/1981 | Prescott | | 277/353 |
| 6,565,096 B2 * | 5/2003 | Ikeda et al. | | 277/551 |
| 6,840,521 B2 * | 1/2005 | Ikeda | | 277/551 |
| 6,886,834 B2 * | 5/2005 | Osako et al. | | 277/558 |
| 7,055,824 B2 * | 6/2006 | Kobayashi et al. | | 277/309 |

FOREIGN PATENT DOCUMENTS

| | | |
|---|---|---|
| JP | 10-318377 | 12/1998 |
| WO | WO 2004/076894 | 9/2004 |

* cited by examiner

*Primary Examiner* — Vishal Patel
(74) *Attorney, Agent, or Firm* — Harness, Dickey & Pierce, P.L.C.

(57) ABSTRACT

For easier separation and sorting by material of constructing parts and better assembly retainability among the constructing parts and installing workability, a lip type seal has a elastic material-made first lip seal member (11) including a cylinder portion (12) fitted into a shaft hole (72) and a first seal lip (14) arranged at a sealed fluid side (A) and contacted with a shaft (73), a resin-made second lip seal member (21) including a second seal lip (23) arranged at an atmospheric air side (B) and contacted with the shaft (73), a metal-made spacer ring (31) arranged at the sealed fluid side (A) of the second lip seal member (21), and a metal-made retaining ring (41) retaining the spacer ring (31) and the second lip seal member (21), and these parts are assembled without bonding, so that the retaining ring (41) is fitted to the first lip seal member (11).

2 Claims, 4 Drawing Sheets

Prior Art

Prior Art

200
LIP TYPE SEAL

BACKGROUND OF THE INVENTION

1. Field of the Invention

The present invention relates to a lip type seal corresponding to one kind of a sealing apparatus. The lip type seal in accordance with the present invention is used, for example, as a water pump seal for a vehicle such as a motor vehicle or the like, or is used as the other general purpose water pump seal.

2. Description of the Conventional Art

Conventionally, as shown in FIG. 3, there has been known a lip type seal 74 which is installed to an inner periphery of a shaft hole 72 of a housing 71 and slidably comes into close contact with a peripheral surface of a shaft 73 inserted to the shaft hole 72, and the lip type seal 74 has a first seal lip 75 which is arranged at a sealed fluid side A and is made of a rubber-like elastic material, and a second seal lip 76 which is arranged at an atmospheric air side B and is made of a resin (refer to patent Japanese Unexamined Patent Publication No. 10-318377).

Since the conventional lip type seal 74 mentioned above has a plurality of seal lips 75 and 76, each of which performs a seal operation, an excellent seal effect can be achieved, however, has a disadvantage in the following point.

On the basis of a request on recycle in respect to an environmental problem in recent years, disposal of each of constructing parts of the lip type seal is required to be done after being sorted by material. However, in the conventional lip type seal 74 mentioned above, the first seal lip 75 made of the rubber-like elastic material is bonded by vulcanization to a reinforcing ring 77 made of a metal, and both the parts 75 and 77 are formed as an integral product which has been vulcanized and molded. Accordingly, it is impossible to easily separate and sort both the parts 75 and 77 at a time of disposal, and it is therefore impossible to comply with the request on the recycle.

Accordingly, the applicant of the present invention has previously proposed a lip type seal 81 having a first lip seal member 82 provided with a first seal lip 83 arranged at a sealed fluid side A and made of a rubber-like elastic material, a second lip seal member 84 provided with a second seal lip 85 arranged at an atmospheric air side B and made of a resin, and two retaining rings 86 and 87 provided for pinching both the lip seal members 82 and 84 from both sides in an axial direction and made of a metal, and having a structure in which these four parts are assembled in a non-bond manner, as shown in FIG. 4 (refer to WO2004/076894A1). In accordance with this prior art, since each of the parts is not bonded, it is possible to easily separate and sort each of the parts. Accordingly, it is possible to comply with the request on the recycle mentioned above. However, as for the prior art, there is room for improvement in the following points.

(1) Assembly Retaining Characteristic Between Constructing Parts

In the lip type seal 81 mentioned above, two retaining rings 86 and 87 are structured such that they have annular flat surface portions 86a and 87a respectively for pinching both the lip seal members 82 and 84 from both sides in an axial direction and tubular portions 86b and 87b are integrally formed on the flat surface portions 86a and 87a. The tubular portion 86b of the retaining ring 86 at the sealed fluid side A, is fitted to an inner peripheral side of a cylinder portion 82a of the first lip seal member 82 and the tubular portion 87b of is the retaining ring 87 at the atmospheric air side B pressure-inserted and fixed to an insertion hole 82b provided in the cylinder portion 82a of the first lip seal member 82. Accordingly, each of the parts is retained in an assembled state on the basis of setting of a fitting margin and a pressure-inserting margin for the fitting and pressure-insertion. However, an engagement structure for preventing separation between the parts in an axial direction, in the case that each of the parts is exposed to force in the axial direction, is not particularly provided between each of the parts. Therefore, when the retaining ring 86 at the sealed fluid side A is pulled in an axial direction (a direction of an arrow C) in order to detach the lip type seal 81 in a state of being installed to an inner periphery of the shaft hole 72 of the housing 71, there is a case that only this retaining ring 86 is pulled out and the other parts remain in an installed state (or there may be a case that only the retaining ring 86 and the first lip seal member 82 are pulled out, and the second lip seal member 84 and the retaining ring 87 at the atmospheric air side B remain). This is because of nothing but the assembling retaining force between the parts depending only upon friction force.

(2) Installing Workability

Further, in the lip type seal 81 mentioned above, two retaining rings 86 and 87 do not particularly have any structure for defining an interval between them in an axial direction. Further, the first lip seal member 82 pinched between both the rings and made of a rubber-like elastic material can achieve a sufficient seal operation only by being used in a state of being compressed in the axial direction. In other words, there is a risk that a leakage of a sealed fluid may occur from the portion between it and the first lip seal member 82 or the second lip seal member 84 made of a resin or the retaining ring 87 at the atmospheric air side B. Accordingly, at a time of installing the lip type seal 81 mentioned above, the lip type seal 81 is installed by using a snap ring 89 while bringing the lip type seal 81 into contact with a step portion 88 provided at an inner periphery of the shaft hole 72 of the housing 71 and applying a compression load in the axial direction, whereby the lip type seal 81 is installed in a state that the whole thereof is compressed in the axial direction between the step portion 88 and the snap ring 89. However, there is such a disadvantage that a work of installing by using the snap ring 89 while applying the compression load in the axial direction as mentioned above is extremely complicated.

Further, since the cylinder portion 82a of the first lip seal member 82 is provided with the annular insertion hole 82b which is open to the atmospheric air side B, a portion at an outer peripheral side from the insertion hole 82b in the cylinder portion 82a is formed in such a shape that an atmospheric air side end portion 82c thereof terminates so as to keep a cylindrical shape. Accordingly, since the atmospheric air side end portion 82c rubs the inner peripheral surface of the shaft hole 72 at a time of inserting the first lip seal member 82 into the inner periphery of the shaft hold 72 of the housing 71, there is a case that an evagination occurs in the atmospheric air side end portion 82c.

Further, in a bonded type lip seal in which the seal lip 75 made of a rubber-like elastic material is bonded by vulcanization to the reinforcing ring 77 made of a metal as shown in FIG. 3, there is pointed out a problem of foaming resistance. In particular, according to a tendency for a higher speed and a higher temperature of an engine in recent years, cooling water of a water pump for cooling the engine tends to have a high temperature and a high pressure, and a seal portion ambient atmosphere becomes severe. In the bonded type lip seal under the use condition mentioned above, since the seal lip 75 made of a rubber-like elastic material and the reinforcing ring 77 made of a metal are bonded, there is a case that a foaming phenomenon occurs in the seal lip 75 in the case of being used under a high load condition, thereby causing reduction of a sealing performance.

SUMMARY OF THE INVENTION

Problem to be Solved by the Invention

The present invention is made by taking the points mentioned above into consideration, and an object of the present invention is to provide a lip type seal structured such that constructing parts of the lip type seal can be easily separated and sorted by material, thereby making it possible to comply with a request on recycle, an assembly retaining characteristic among the constructing parts is good and an installing workability is good. In addition, an object of the present invention is to provide a lip type seal having good foaming resistance so that a sealing performance can be stabilized.

Means for Solving the Problem

In order to achieve the object mentioned above, in accordance with a first aspect of the present invention, there is provided a lip type seal comprising:
  a first lip seal member provided with a cylinder portion fitted to an inner periphery of a shaft hole of a housing and a first seal lip arranged at a sealed fluid side and brought into pressure contact with a shaft, and made of a rubber-like elastic material;
  a second lip seal member provided with a second seal lip arranged at an atmospheric air side and brought into pressure contact with the shaft, and made of a resin;
  a spacer ring arranged at the sealed fluid side of the second lip seal member and made of a metal; and
  a retaining ring provided for retaining the spacer ring and the second lip seal member and made of a metal,
  the lip type seal being formed by contacting and fitting an outer peripheral surface of the retaining ring with an inner peripheral surface of the first lip seal member, and the respective parts being assembled in a non-bonded manner,
  wherein the retaining ring integrally has a tubular portion, a first inward flange portion provided on a sealed fluid side end portion of the tubular portion, a fold-back portion continuously provided on the atmospheric air side end portion of the tubular portion, and a second inward flange portion continuously provided on the fold-back portion, the spacer ring and the second lip seal member are fixed by caulking between the first inward flange portion and the second inward flange portion, the first lip seal member integrally has the cylinder portion arranged at an outer peripheral side of the tubular portion of the retaining ring, a radial portion provided on the sealed fluid side end portion of the cylinder portion, the first seal lip provided on an inner peripheral end portion of the radial portion, and an inward collar portion provided on the atmospheric side end portion of the cylinder portion, a fitting concave portion is provided for fitting the retaining ring, a bottom surface of the fitting concave portion is formed so as to come into contact with each of the outer peripheral surfaces of the first inward flange portion, the tubular portion and the fold-back portion of the retaining ring, and the retaining ring, to which the spacer ring and the second lip seal member are fixed by caulking fitted to the fitting concave portion in a non-bond manner.

Further, in accordance with a second aspect of the present invention, there is provided a lip type seal as recited in the first aspect mentioned above, wherein the spacer ring integrally has a backup portion for supporting the first seal lip from the atmospheric air side, on an inner peripheral end portion thereof.

The lip type seal in accordance with the present invention provided with the structure mentioned above is installed to the inner periphery of the shaft hole of the housing so as to seal the sealed fluid, has four parts including the first lip seal member provided with the cylinder portion fitted to the inner periphery of the shaft hole of the housing and the first seal lip arranged at the sealed fluid side and brought into pressure contact with the shaft, and made of the rubber-like elastic material, the second lip seal member provided with the second seal lip arranged at the atmospheric air side and brought into pressure contact with the shaft, and made of the resin, the spacer ring arranged at the sealed fluid side of the second lip seal member and made of the metal, and the retaining ring provided for retaining the spacer ring and the second lip seal member and made of the metal, and is structured such as to fix by caulking the spacer ring and the second lip seal member with the retaining ring and fit the retaining ring to the inner peripheral side of the first lip seal member. Accordingly, since each of the parts is assembled in the non-bond manner, it is possible to easily separate and sort each of the parts at a time of disassembling.

Further, since the spacer ring and the second lip seal member are fixed by caulking with the retaining ring, these three parts can be firmly assembled with each other even in the non-bond manner, and are not relatively displaced in the axial direction. Since the retaining ring is fitted between the radial portion and the inward collar portion (the fitting concave portion) at the inner peripheral side of the cylinder portion of the first lip seal member, these two parts can be firmly assembled with each other even in the non-bond manner, and are not relatively displaced in the axial direction. Accordingly, since all of four parts are firmly assembled in conjunction with each other, it is possible to increase the assembly retaining force between the parts.

Further, since each of the parts has been already fixed and integrated with each other and the assembly is thus finished to be in a ready-to-use state at a time of installing the lip type seal, it is possible to omit a regulating step or the like for maintaining an assembling length precision in the axial direction which is required in an installing process of the conventional non-bond lip seal.

Further, since the inward collar portion is integrally formed on the atmospheric air side end portion of the cylinder portion of the first lip seal member and the inward collar portion is engaged with the retaining ring, the evagination does not occur at the atmospheric air side end portion of the cylinder portion at a time of being inserted to the inner periphery of the shaft hole of the housing.

Further, the lip type seal is fixed to the housing in the installed state on the basis of the tubular portion of the retaining ring being fitted to the inner periphery of the shaft hole of the housing. The cylinder portion of the first lip seal member is interposed between the tubular portion of the retaining ring and the inner peripheral surface of the shaft hole of the housing, however, since the cylinder portion is constituted by the rubber-like elastic body, the cylinder portion is compressed in the radial direction so as to achieve the seal operation between the tubular portion of the retaining ring and the inner peripheral surface of the shaft hole of the housing. Under such the condition, in the lip type seal mentioned above, since the fold-back portion is continuously provided on the atmospheric air side end portion of the tubular portion, the length in the axial direction of the tubular portion is substantially extended in comparison with the case that the fold-back portion is not provided. Accordingly, the fitting surface with respect to the housing is set wide.

Further, since the structure is not made such as to bond the rubber-like elastic material with the metal, the foaming phenomenon does not occur in the seal lip (the rubber-like elastic material) even if the seal lip is used under the high load condition.

Further, in the case that the inner peripheral end portion of the spacer ring is integrally provided with the backup portion for supporting the first seal lip from the atmospheric air side, it is possible to stabilize the operation of the first seal lip made of the rubber-like elastic material on the basis of a support operation achieved by the backup portion.

Effect of the Invention

The present invention achieves the following effects.

In the present invention, since the lip type seal has the first lip seal member made of the rubber-like elastic material, the second lip seal member made of the resin, and the spacer ring and the retaining ring made of the metal, as mentioned above, the spacer ring and the second lip seal member are fixed by caulking with the retaining ring and the retaining ring is fitted to the inner peripheral side of the first lip seal member, it is possible to easily separate and sort each of the parts at a time of disassembling the seal. Accordingly, it is possible to comply with such the request on the recycle that disposal of the constructing parts of the lip type seal is to be done after being sorted by material.

Further, since the spacer ring and the second lip seal member are fixed by caulking with the retaining ring, these three parts can be firmly assembled in spite of non-bond. Since the retaining ring is fitted between the radial portion and the inward collar portion (to the fitting concave portion) at the inner peripheral side of the cylinder portion of the first lip seal member, these two parts can be firmly assembled in spite of non-bond. Accordingly, since all of four parts can be thus firmly assembled, it is possible to increase the assembly retaining force among the parts. Therefore, it is possible to prevent occurrence of the disadvantage that only some of the parts are pulled out at a time of detaching the lip type seal from the housing like as the prior art.

Further, since each of the parts has been completely assembled at a time of installing the lip type seal, it is possible to omit the regulating step or the like for maintaining the assembling length precision in the axial direction which has been required in the installing process of the conventional non-bond lip seal.

Further, since the inward collar portion is integrally formed on the atmospheric air side end portion of the cylinder portion of the first lip seal member and the inward collar portion is engaged with the retaining ring, it is possible to prevent the evagination from occurring at the atmospheric air side end portion of the cylinder portion at a time of being inserted to the inner periphery of the shaft hole of the housing.

Further, since the fold-back portion is continuously provided on the atmospheric air side end portion of the tubular portion of the retaining ring, the length in the axial direction of the tubular portion is substantially extended in comparison with the case that the fold-back portion is not provided. Accordingly, since the fitting surface with respect to the housing is expanded, it is possible to firmly fix it to the housing.

Further, since the structure is not made such that the rubber-like elastic body and the metal are bonded, the foaming phenomenon does not occur in the seal lip (the rubber-like elastic material) even if the seal lip is used under the high load condition. Accordingly, it is possible to improve the foaming resistance of the lip type seal, and it is possible to stabilize the sealing performance.

Further, in the case that the inner peripheral end portion of the spacer ring is integrally provided with the backup portion for supporting the first seal lip from the atmospheric air side, it is possible to stabilize the operation of the first seal lip made of the rubber-like elastic material, on the basis of the support operation by the backup portion.

DETAILED DESCRIPTION OF PREFERRED EMBODIMENT

Next, a description will be given of an embodiment in accordance with the present invention with reference to the accompanying drawings.

Figure 1:
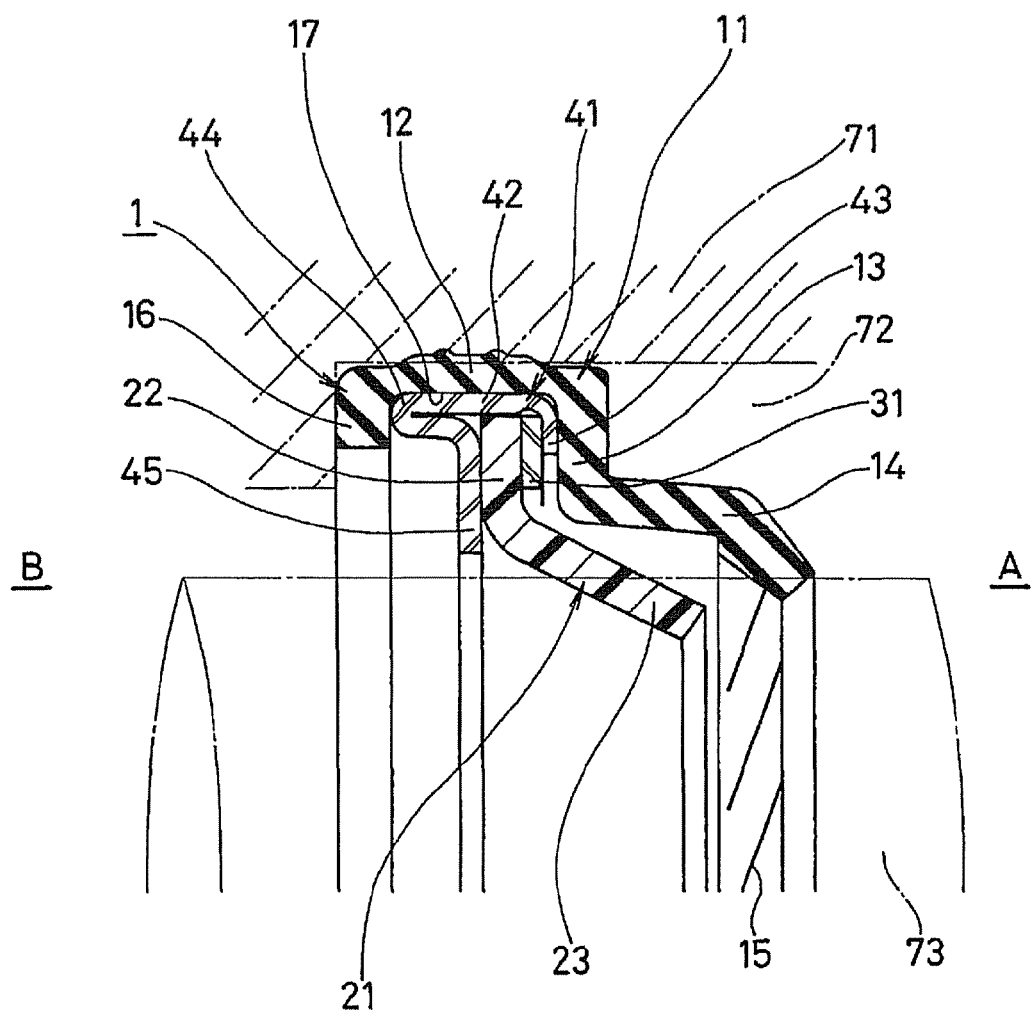
FIG. 1 is a sectional view of a substantial part of a lip type seal in accordance with an embodiment of the present invention.

FIG. 1 shows a section of a lip type seal 1 in accordance with an embodiment of the present invention, and the lip seal 1 is structured as follows. In this case, the lip seal 1 is used as a water pump seal for a motor vehicle for sealing cooling water. The right side of the drawing shows cooling water, that is, a sealed fluid side A, and the left side of the drawing shows an atmospheric air side B.

The lip type seal 1 is installed to an inner periphery of a shaft hole (a bore) 72 of a housing (a pump housing) 71, is structured such as to slidably come into close contact with a peripheral surface of a shaft 73 inserted to the shaft hole 72, and is constituted by four parts including a first lip seal member 11 provided with a cylinder portion 12 fitted to an inner periphery of the shaft hole 72 of the housing 71 and a first seal lip 14 arranged at the sealed fluid side A and brought into pressure contact with the shaft 73 and made of a rubber-like elastic material, a second lip seal member 21 provided with a second seal lip 23 arranged at the atmospheric air side B and brought into pressure contact with the shaft 73 and made of a resin, a spacer ring 31 arranged at the sealed fluid side A of the second lip seal member 21 and made of a metal, and a retaining ring 41 provided for retaining the spacer ring 31 and the second lip seal member 21 and made of a metal. Each of the parts 11, 21, 31 and 41 are assembled in a non-bond manner in a state that an outer peripheral surface of the retaining ring 41 comes into contact with an inner peripheral surface of the first lip seal member 11 and is fitted thereto.

First of all, the retaining ring 41 is constructed by a pressed product of a metal plate, and integrally has a tubular portion 42, a first inward flange portion 43 provided on a sealed fluid side end portion of the tubular portion 42, a fold-back portion 44 continuously provided on an atmospheric air side end portion of the tubular portion 42, and a second inward flange portion 45 continuously provided on the fold-back portion 44, and the spacer ring 31 and the second lip seal member 21 are fixed by caulking between the first and second inward flange portions 43 and 45. Since the fold-back portion 44 is constructed by a double cylinder structure having a U-shaped cross section, and the second inward flange portion 45 is integrally formed on a sealed fluid side end portion of an inner peripheral cylinder thereof so as to be directed to an inner side in a radial direction, the fold-back portion 44 protrudes to the atmospheric air side B than the second inward flange portion 45 as a whole.

The second lip seal member 21 is made of a predetermined resin material (PTFE or the like), and a seal lip (a second seal lip) 23 is integrally formed on an inner peripheral end portion of an annular flat surface portion 22 so as to incline toward the sealed fluid side A. Since the second seal lip 23 is arranged at the atmospheric air side B of the first seal lip 14, the second seal lip 23 serves as a secondary seal.

The spacer ring 31 is made of a pressed product of a metal plate like as the retaining ring 41, and is formed in an annular flat surface shape. Since the spacer ring 31 is arranged between the first inward flange portion 43 of the retaining ring 41 and the second lip seal member 21, it is possible to prevent the first inward flange portion 43 from directly coming into contact with the second lip seal member 21 so as to damage it, in a caulking step which is carried out by bending the first inward flange portion 43. Further, since an inner diameter of the spacer ring 31 is set smaller than an inner diameter of the first inward flange portion 43, it is possible to firmly retain the second lip seal member 21 after caulking.

The first lip seal member 11 is constituted by a predetermined rubber-like elastic material, and integrally has a cylinder portion 12 arranged at an outer peripheral side of the tubular portion 42 of the retaining ring 41, a radial portion 13 integrally formed from a sealed fluid side end portion of the cylinder portion 12 toward an inner side in a radial direction, a first seal lip 14 integrally formed on an inner peripheral end portion of the radial portion 13, and an inward collar portion 16 integrally formed on an atmospheric air side end portion of the cylinder portion 12. The first seal lip 14 is formed in such a manner as to extend long to the sealed fluid side A, and is provided with a screw seal 15 for achieving a pumping operation on an inner peripheral surface of a leading end thereof. An annular fitting concave portion 17 is formed between the radial portion 13 and the inward collar portion 16 at the inner peripheral side of the cylinder portion 12 so as to be open toward an inner side in the radial direction, and the retaining ring 41, to which the spacer ring 31 and the second lip seal member 21 are fixed by caulking, is fixed by fitting (fitted) thereto. A bottom surface of the fitting concave portion 17 (an inner peripheral surface of the cylinder portion 12) is formed so as to come into contact with each of outer peripheral surfaces of the first inward flange portion 43, the tubular portion 42 and the fold-back portion 44 of the retaining ring 41.

In the lip type seal 1 having the structure mentioned above, four parts including the first lip seal member 11 provided with the cylinder portion 12 fitted to the inner periphery of the shaft hole 72 of the housing 71 and the first seal lip 14 arranged at the sealed fluid side A and brought into pressure contact with the shaft 73 and made of the rubber-like elastic material, the second lip seal member 21 provided with the second seal lip 23 arranged at the atmospheric air side B and brought into pressure contact with the shaft 73 and made of the resin, the spacer ring 31 arranged at the sealed fluid side A of the second lip seal member 21 and made of the metal, and the retaining ring 41 provided for retaining the spacer ring 31 and the second lip seal member 21 and also made of the metal are assembled in the non-bond manner by means of fixing the spacer ring 31 and the second lip seal member 21 by caulking with the retaining ring 41, and fitting the retaining ring 41 to the inner peripheral side of the first lip seal member 11.

Accordingly, since each of the parts is assembled in the non-bond manner, it is possible to easily separate and sort each of the parts at a time of disassembling. Accordingly, it is possible to comply with such the request on recycle that disposal of parts is to be done after being sorted by material.

Further, since the spacer ring 31 and the second lip seal member 21 are fixed by caulking with the retaining ring 41, these three parts 21, 31 and 41 can be firmly assembled with each other even though they are not bonded. Since the retaining ring 41 is fitted between the radial portion 13 and the inward collar portion 16, that is, to the fitting concave portion 17 at the inner peripheral side of the cylinder portion 12 of the first lip seal member 11, these two parts 11 and 41 are firmly assembled with each other even though they are not bonded. Accordingly, since all of four parts are firmly assembled with each other, it is possible to increase the assembly retaining force among the parts. Therefore, it is possible to prevent occurrence of the disadvantage that only some of the parts are pulled out at a time of detaching the lip type seal from the housing like as the prior art mentioned above.

Further, since each of the parts has been already assembled completely at a time of installing the lip type seal 1 to the inner periphery of the shaft hole 72 of the housing 71, there is no risk of the evagination of the fitting portion of the first lip seal member 11 (the atmospheric air side end portion of the cylinder portion 12) at a time of inserting the housing like as the prior art mentioned above, and it is not necessary to use a snap ring for maintaining the assembling precision. Therefore, it is possible to make the installing work of the lip type seal easy and it is possible to improve the installing workability.

Further, the lip type seal 1 is structured such that the tubular portion 42 of the retaining ring 41 is fitted to the inner periphery of the shaft hole 72 of the housing 71, thereby being fixed to the housing 71, in a state of being installed to the inner periphery of the shaft hole 72 of the housing 71, and the atmospheric air side end portion of the tubular portion 42 is continuously provided with the fold-back portion 44 having the U-shaped cross section. Accordingly, the length in the axial direction of the tubular portion 42 is substantially extended in comparison with the case that the fold-back portion 44 is not provided. Therefore, since the wide fitting surface is thus set with respect to the housing 71, it is possible to achieve the structure of being firmly fixed to the housing 71.

Further, since the structure is not made such as to bond the rubber-like elastic material and the metal, the foaming phenomenon does not occur in the first seal lip 14 (the rubber-like elastic material) even if the seal lip is used under the high load condition. Accordingly, it is possible to improve the foaming resistance of the lip seal and it is possible to stabilize the sealing performance.

Figure 2:
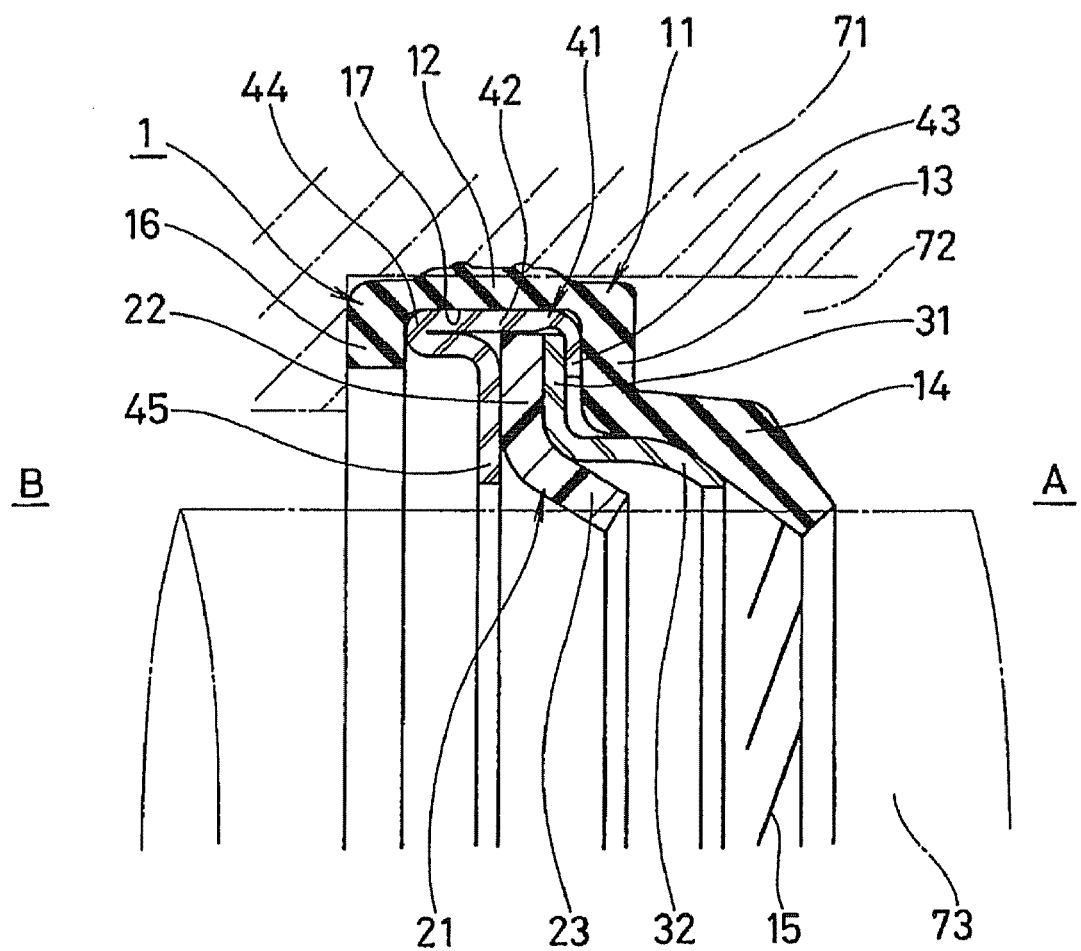
FIG. 2 is a sectional view of a substantial part of a lip type seal in accordance with another embodiment of the present invention.
Figure 3:
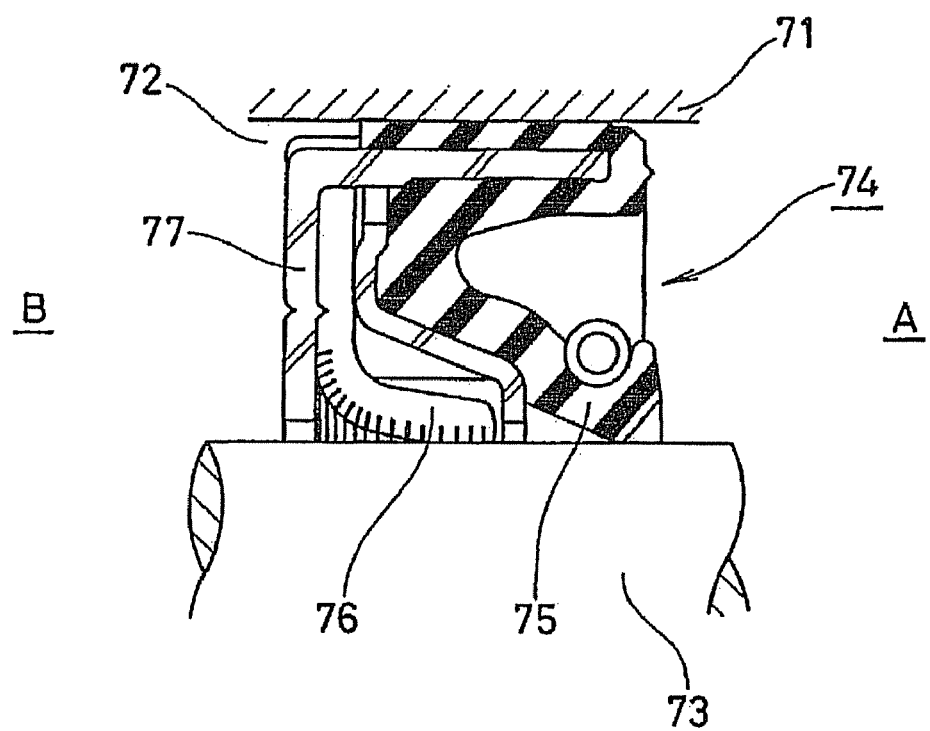
FIG. 3 is a half sectional view of a lip seal in accordance with a conventional art.
Figure 4:
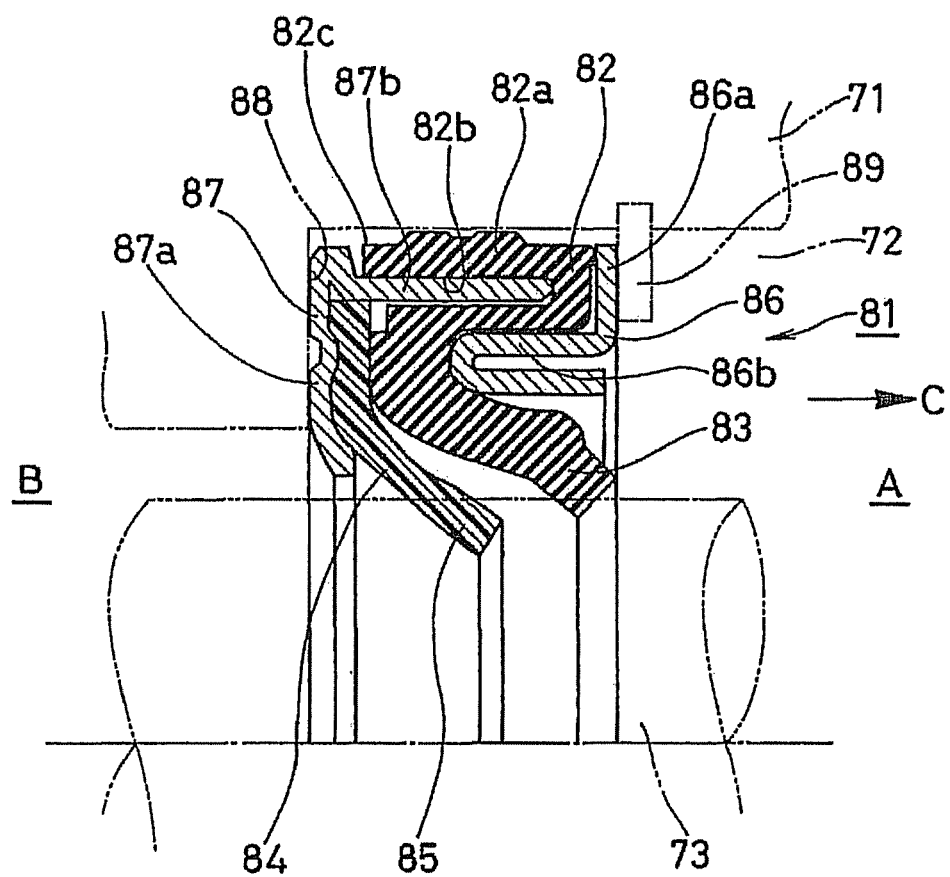
FIG. 4 is a half sectional view of a lip seal in accordance with another conventional art.

In addition, in the embodiment mentioned above, the spacer ring 31 is formed as a simple annular flat part, however, the backup portion 32 for supporting the first seal lip 14 from the atmospheric air side B may be integrally formed on the inner peripheral end portion of the spacer ring 31 as shown in FIG. 2. In this case, it is possible to stabilize the operation of the first seal lip 14 made of the rubber-like elastic material on the basis of the support operation (the backup operation) done by the backup portion 32. The backup portion 32 is largely bent in a circular arc shape toward the sealed fluid side A so as to be capable of retaining the first seal lip 14 in a wide area.

Further, when the first seal lip 14 is backed up by the backup portion 32 as mentioned above, the first seal lip 14 is not largely deformed elastically even under the operation of the high pressure. Accordingly, it is possible to prevent occurrence of the disadvantage that the first seal lip 14 presses the second seal lip 23, the abrasion of the second seal lip 23 thereby progresses, and consequently a posture of the first seal lip 14 is hardly controlled to cause the reduction of the sealing performance.

Further, in the embodiment mentioned above, the lip type seal 1 is directly fitted to the inner periphery of the shaft hole 72 of the housing 71 with the cylinder portion 12 of the first lip seal member 11, however, may be installed to the inner periphery of the shaft hole 72 of the housing 71 via a cartridge (not shown).

What is claimed is:

1. A lip seal comprising:
   a first lip seal member provided with a cylinder portion fitted to an inner periphery of a shaft hole of a housing and a first seal lip arranged at a sealed fluid side and brought into pressure contact with a shaft, and made of an elastomeric material;
   a second lip seal member provided with a second seal lip arranged at an atmospheric air side and brought into pressure contact with the shaft, and made of a resin;
   a spacer ring arranged at the sealed fluid side of said second lip seal member and made of a metal; and
   a retaining ring retaining said spacer ring and the second lip seal member and made of a metal,
   the lip seal being formed by contacting and fitting an outer peripheral surface of said retaining ring with an inner peripheral surface of said first lip seal member, and said respective parts being assembled in a non-bond manner,
   wherein said retaining ring integrally has a tubular portion, a first inward flange portion provided on a sealed fluid side end portion of said tubular portion, a fold-back portion continuously provided on the atmospheric air side end portion of said tubular portion, and a second inward flange portion continuously provided on said fold-back portion, and said spacer ring and the second lip seal member are fixed by caulking between said first inward flange portion and the second inward flange portion,
   wherein said first lip seal member integrally has said cylinder portion arranged at an outer peripheral side of the tubular portion of said retaining ring, a radial portion provided on the sealed fluid side end portion of said cylinder portion, said first seal lip provided on an inner peripheral end portion of said radial portion, and an inward collar portion provided on the atmospheric side end portion of said cylinder portion, and a fitting concave portion is provided for fitting said retaining ring,
   wherein a bottom surface of said fitting concave portion is formed so as to come into contact with each of the outer peripheral surfaces of the first inward flange portion, the tubular portion and the fold-back portion of said retaining ring, and
   wherein said retaining ring, to which said spacer ring and the second lip seal member are fixed by caulking, is fitted to said fitting concave portion in a non-bond manner.

2. A lip type seal as claimed in claim 1, wherein the spacer ring integrally has a backup portion supporting the first seal lip from the atmospheric air side, on an inner peripheral end portion thereof.

* * * * *